March 26, 1940.　　A. D. MacLEAN　　2,195,337
FLUID PRESSURE REGULATOR
Filed Nov. 11, 1936　　2 Sheets-Sheet 1
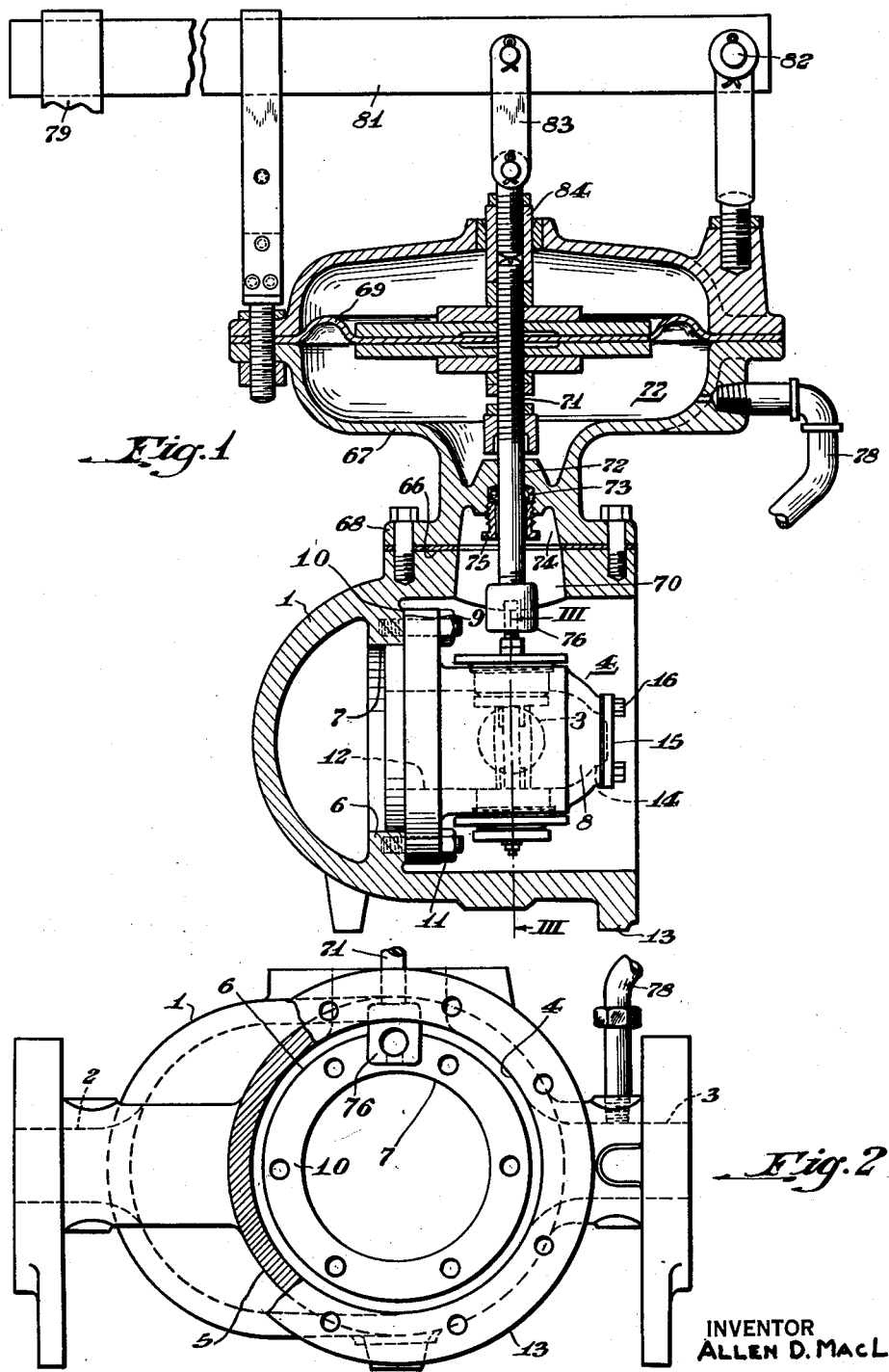
INVENTOR
ALLEN D. MacLEAN
BY Strauch & Hoffman
ATTORNEYS March 26, 1940.  A. D. MacLEAN  2,195,337
FLUID PRESSURE REGULATOR
Filed Nov. 11, 1936  2 Sheets-Sheet 2

INVENTOR.
ALLEN D. MacLEAN.
BY
Strauch & Hoffman
ATTORNEYS

Patented Mar. 26, 1940

2,195,337

UNITED STATES PATENT OFFICE 2,195,337

FLUID PRESSURE REGULATOR

Allen D. MacLean, Pittsburgh, Pa., assignor to Pittsburgh Equitable Meter Company, Pittsburgh, Pa., a corporation of Pennsylvania Application November 11, 1936, Serial No. 110,359

5 Claims. (Cl. 50—27)

This invention relates to improvements in pressure regulators, particularly of the balanced valve type intended for high pressure service.

In regulators of this type, a wing type of guide heretofore has been employed for guiding the valve in its movement. However, the wing guide has the disadvantage that it is located at the point of expansion and high velocity of the gas where it is subject to cutting by the high velocity gas and accumulates tar and gums which cause sticking of the valve. The wings also reduce the area of the opening of the valve and cut down the capacity of the regulator.

According to the present invention I locate the guide for the valve on the high pressure side thereof so that it is removed from the high velocity area of the expanding gas. Consequently, the congealing of tar and gum on the valve guide due to the cooling effect of the expanding gas which causes the valve to stick is substantially eliminated. The location of the guide in this manner results in an increased life for the valve because there is no concentration of velocity such as occurs in the wing type of guide to cause excessive localized wear. This also results in an increased capacity of the regulator, and allows the use of various improved forms of valves.

It is an object of this invention to provide in a pressure regulator a novel guide for the valve stem, the guide being removed from the expansion area in the valve so as to eliminate sticking of the valve due to congealed tar, gum and other foreign matter deposited thereon by reason of the cooling of the expanding gas.

Still a further object of this invention is to provide novel guide means wherein the means is positioned entirely within the valve bowl in the high pressure zone to reduce resistance to fluid flow to a minimum and to reduce wear thereof by reason of high velocity fluid flow thereby.

A further object of my invention is to provide novel guide means for the valve stem of a regulator whereby friction is reduced to a minimum and contact between the several valve elements of the regulator takes place only in closed position of the regulator, the elements being free from contact with one another in all other positions of the regulator.

It is a further object to provide readily removable valves and valve seats whereby any of these parts worn out in service may be replaced and adjusted from the exterior of the bowl without disturbing the regulator connections.

A further object is the provision of novel means for adjusting a plurality of valves to provide for simultaneous closing thereof against the valve seats.

A further object is to provide a novel regulator structure comprising a removable bowl carrying valve members secured to a valve stem and having a guide for the valve stem, the entire assembly being removable as a unit without removing the regulator from the line.

Another object is the provision of a valve bowl having a central guide for the valves operating therein with means for lubrication thereof.

These and other objects will be apparent from a consideration of the following description taken in connection with the accompanying drawings wherein:

Figure 1 is a vertical section of a regulator, the side closing plate being removed;

Figure 2 is a side view of the regulator with the valve bowl and valves removed;

Figure 3:
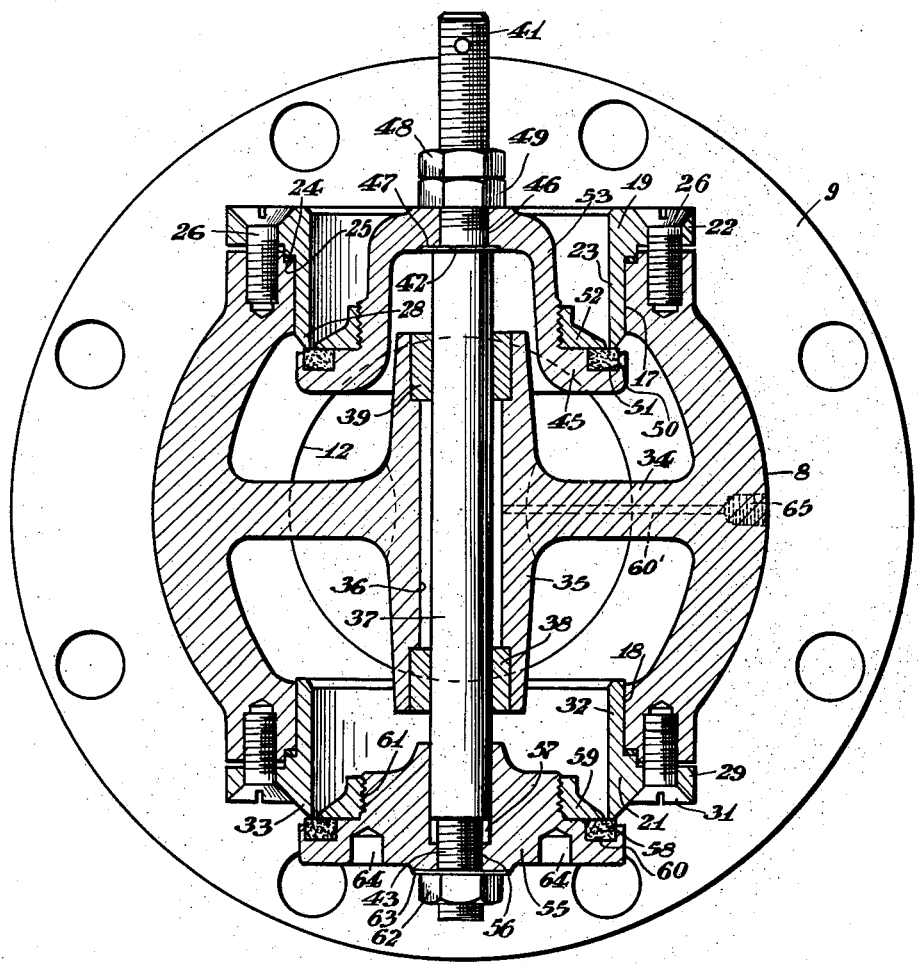
Figure 3 is a section view taken on line III—III of Figure 1.

Referring to the drawings, the apparatus comprises a valve casing 1 having a high pressure inlet passage 2, and a low pressure outlet passage 3 communicating with a bowl chamber 4, the passages being separated by a horizontal curved dividing wall 5 having a vertical portion 6. Vertical portion 6 has an opening 7 therethrough for the passage of gas from the inlet passage 2 to the outlet passage 3. A valve bowl 8 has a machined flange 9 at one end which is machined on one face and is adapted to be secured to a machined face 10 of the dividing wall 6 in any suitable manner, as by stud bolts 11, the flange 9 having a guide portion extended into opening 7. This construction enables valve bowl 8 to be readily removed and replaced and eliminates the necessity for special sealing means therefor.

A passage 12 through the flange 9 communicates with the opening 7 and with the interior of the bowl 8. The bowl chamber 4 is adapted to be closed by a cover (not shown) bolted to the flange 13 on the valve casing surrounding the chamber, the cover being sealed by suitable means.

The removable bowl 8 has an opening 14 in the opposite end wall adapted to be covered by a cover 15 secured thereto by bolts 16, a suitable gasket being interposed to prevent leakage. Opposed and vertically spaced openings 17 and 18 are provided in the wall of the bowl to receive valve seat members 19 and 21. The fixed valve seat member 19 comprises a flange 22 surrounding a cylindrical skirt 23 received in the opening 17 in the wall of the bowl. A step 24 on the flange is received on a shoulder 25 formed in the valve bowl 8 surrounding opening 17. The valve seat member 19 is held in position by screws 26, a suitable gasket being interposed between the step 24 and shoulder 25 to prevent leakage therebetween. The innermost edge of the cylindrical portion 23 of the valve seat member 19 is tapered to provide a sharp edged annulus 28. The valve seat member 21 has a flange 29 through which passes the screws 31 by which the member is secured to the bowl. The valve seat member 21 has a cylindrical skirt 32 received in the opening 18 of the bowl. Skirt 32 has a portion thereof tapered to provide a sharp edged annulus 33.

A diametrically disposed integral bar 34 rectangular in cross section in the bowl 8 supports a central hub 35 integral therewith, the hub being bored at 36 to allow a clearance for the valve stem 37 which passes therethrough and which is journaled in bushings 38 and 39 suitably fitted in the counterbored ends of the hub 35. The hub 35 and bar 34 constitute guide means for the valve stem, the guide means being positioned entirely within the bowl so that it is subject to only the high pressure fluid.

The valve stem 37 extends through the cylindrical skirts 23 and 32 of the valve seat members 19 and 21 respectively, and is reduced and threaded at one end as indicated at 41 to provide a shoulder 42. The opposite end of the stem 37 is reduced and threaded as indicated at 43. A valve or valve member 45 which is substantially bell-shaped has an opening 46 therethrough at one end which receives the reduced end 41 of the valve stem, the end of the bell resting on the shoulder 42 on a washer 47 of copper or other suitable sealing material. By forming valve member 45 in the shape of a bell, it is possible to lengthen the hub 35 and correspondingly increase the efficiency of the guide means.

The valve member 45 is secured in place against shoulder 42 and washer 47 by lock nuts 48 and 49 threaded on to the reduced end 41 of the shaft. Member 45 is recessed adjacent its outer edge at 50 to receive an inlaid annulus 51 of any suitable sealing material, such as semi-steel or tool-steel for high pressure valves, or rubber, "Paraprene" or the like for low pressure valves, the annulus 51 being retained in place by an internally threaded retaining ring 52 threaded on to the cylindrical threaded hub 53 of the member 45.

A second valve member 55 has a threaded bore 56 therein and a counterbore 57, the opposite reduced end 43 of the stem 37 being received in the threaded bore 56 of the valve member, and the shaft 37 being received in the counterbore 57 which forms a close fit therewith. Member 55 is recessed as at 60 to receive an inlaid annulus 58 of any suitable sealing material, the annulus being retained in place by an internally threaded retaining ring 59 threaded on a cylindrical threaded portion 61 of the valve member. In assembled position the valve member is threaded on the reduced threaded portion 43 of the valve stem 37 by a suitable spanner wrench (not shown) fitting into holes 64, the fit of the counterbore 57 with the stem 37 serving as a guide to maintain the valve member and seat 21 parallel.

The arrangement thus described provides means whereby member 55 can be adjusted to a point where valve sealing members 51 and 58 will seat simultaneously against the valve seats 28 and 33, respectively, upon predetermined movement of valve stem 37. Member 55 is locked in this position by a lock nut 62 threaded on to the threaded reduced portion 43 of the valve stem, a suitable washer 63 of copper or other sealing material being interposed between the nut 62 and the member 55.

Figure 4:
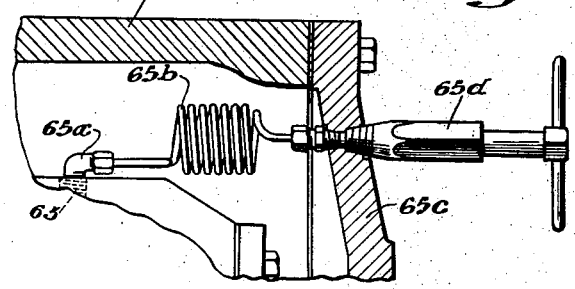
Figure 4 is a fragmentary view showing a preferred lubricator.

As shown in Figure 3, there is a lubricating passage 68' extending through one of the spokes 34 which terminates in an enlarged threaded bore 65 adapted to receive any suitable type of pressure lubricant fitting. In the preferred modification shown in Figure 4, an elbow 65a is threaded therein and is connected by a suitable tube coupling with a coil of tubing 65b passing through the cover 65c and adapted to receive a pressure fitting 65d at its outer end.

This arrangement insures operation of the valve guide means with a minimum of friction. In this particular, it is to be noted that there is no other resistance to valve stem movement except that in the guide since the valve elements herein shown do not contact and hinder movement of the valve stem until they are in closed position. At all other positions, they are out of contact. Such lubrication and elimination of friction between the valve elements and guide means has not been possible heretofore where wing guides and like means have been employed.

Referring to Figure 1, the casing 1 has an opening 70 at its top surrounded by a machined face 66. A diaphragm case 67 having a flange 68, preferably with a machined face, is secured to the face 66 in any suitable manner, a gasket preferably being employed therebetween for sealing purposes. The diaphragm case 67 houses a diaphragm 69 clamped at its outer perphery between the two halves of the diaphragm case, the diaphragm 69 being secured at its center in any suitable manner to a valve operating rod 71. The valve operating rod 71 passes through a bore 72 in the lower portion of the diaphragm casing which is counterbored to provide a packing chamber 73. A recess 74 formed in the lower portion of the casing accommodates a follower or gland 75 for packing chamber 73 whereby leakage around the valve operating rod 71 is prevented. The stem 71 at one end carries a block 76 to which the reduced end 41 of the valve stem 37 is adapted to be removably secured in known manner as by a pin.

The pressure in the regulator outlet 3 is transmitted to the control chamber 77 through a suitable pipe 78 connected therewith at one end and to the outlet 3 at its other end. The gas pressure in control chamber 77 is counterbalanced in any suitable manner, as by a weight 79 on the end of the lever 81 mounted on a fixed pivot 82 at one end and connected by a swiveled link 83 to a guided rod 84 which bears on the end of operating rod 71.

The operation of the apparatus will now be described. Fluid such as gas under pressure enters the inlet side 2, and when the valve members 45 and 55 are in open position, the fluid passes around dividing walls 5 and 6 through opening 7 therein into valve bowl 8 and through the open valves into the outlet 3, the pressure in the outlet 3 being communicated by pipe 78 to the control chamber 77. When the pressure in the control chamber reaches that for which the regulator is set, the diaphragm 69 is raised upward, and through rod 71 coupled to valve stem 37, the valve members 45 and 55 having the seats 51 and 58, respectively, are moved upwardly against the valve seats 28 and 33, respectively, to close communication between the inlet and outlet. The central bushings 38 and 39 provide a working clearance with the valve stem 37 so that the stem moves readily therethrough and is accurately longitudinally guided in its motion so as to enable the valve seals 51 and 58 to engage the valve seats correctly. The valve members may be adjusted to act simultaneously because the member 55 is threaded on to the valve stem 37 and is held locked in position by the lock nut 62.

When it is necessary to make any adjustment or repair, the valve bowl may be removed as a unit by removing the side cover 65c bolted to flange 13, and unscrewing the nuts from the studs 11 which disconnect the valve bowl from the casing and allows its removal through the opening in flange 13, the connecting block 76 being readily uncoupled from the valve stem 37. The parts of the valve are thus readily accessible for replacement or repair.

It will be understood that various modifications may be made in the construction illustrated and described without departing from the invention. The valve seats and edges may be interchangeable, that is, one or both seats may be secured to the valve bowl while the stem carries both or one respectively valve edges.

Summing up the more obvious advantages of the present invention; the guide provided for the valves is located on the high pressure side of the valve so that it is not subject to undue wear and gum and other foreign matter will not condense thereon as in the zone of the expanding gas. The invention further provides a valve bowl and valve means susceptible of ready removal and replacement without disturbing the regulator connections, the valve means being capable of adjustment without removal of the bowl. The ease of operation and sensitivity of the regulator is likewise increased by lubrication of the valve guiding means whereby the latter moves with a minimum of effort.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a pressure regulator, a valve casing having a high pressure inlet, a bowl chamber separated therefrom by a perforate dividing wall, a lateral opening in said bowl chamber adapted to be closed by a cover, a valve bowl removably secured to said dividing wall and removable through said opening, said valve bowl communicating with said inlet and having two aligned valve apertures therein, a low pressure outlet in said casing communicating with said valve bowl through said valve apertures, a longitudinally movable valve stem carrying valve members cooperating with said valve apertures to control the flow of fluid therethrough from said inlet to said outlet, diaphragm means for controlling the position of said valve members and including a valve operating rod extending into said bowl chamber and secured to said valve stem, guide means for said valve stem, said guide means being located wholly within, and supported by, said valve bowl on the high pressure side of said valve members, whereby said valve apertures are unobstructed and said guide means and valve stem are removed from the high velocity area of expanding fluid.

2. In a pressure regulator, a valve casing having a high pressure inlet and a low pressure outlet, a dividing wall providing a bowl having two aligned valve apertures thereon separating said inlet and said outlet, a valve stem in said bowl, valve members on said stem adjacent the ends thereof cooperating with said valve apertures to control the flow of fluid therethrough from said inlet to said outlet, pressure responsive means connected to said valve stem for controlling the action of said valve members, and guide means for said valve stem, said guide means being located wholly within said bowl and on the high pressure side of said valve apertures, whereby said valve apertures are unobstructed and said guide means and said valve stem are removed from the high velocity area of expanding fluid flowing through said valve casing.

3. In a pressure regulator, a valve casing having a high pressure inlet and a low pressure outlet, a dividing wall providing a bowl having two aligned and spaced valve apertures therein, a valve stem in said bowl, valve members carried by said stem adjacent the ends thereof cooperating with said apertures to control the flow of fluid therethrough, one of said valve members being substantially bell shaped and secured in predetermined position on said stem so as to encircle one end of said stem and cooperate with one of said apertures, the other of said valve members being adjustably secured to said stem to cooperate with the other of said apertures, pressure responsive means operably connected to said valve stem for controlling the action of said valve members, and guide means for said valve stem, said guide means being located wholly within said bowl on the high pressure side of said valve apertures and with one end encircled by said bell shaped valve member, whereby said valve apertures are unobstructed and said valve stem and guide means are removed from the high velocity area of expanding fluid.

4. In a pressure regulator, a casing having a high pressure inlet and a low pressure outlet, a dividing wall providing a bowl having two aligned valve apertures therein, a valve stem in said bowl, valve members carried by said stem and cooperating with said apertures to control the flow of fluid therethrough, one of said valve members being held in predetermined position on one end of said stem to cooperate with one of said apertures and the other of said valve members being adjustably secured to the opposite end of said stem to cooperate with the other of said apertures, an access hole in said casing to permit adjustment of said second valve member, pressure responsive means operably connected to said valve stem for controlling the action of said valve members, and a central guide means for said valve stem, said guide means being located wholly within said bowl between said apertures and on the high pressure side thereof, whereby said valve apertures are unobstructed and said valve stem and guide means are removed from the high velocity area of expanding fluid.

5. In a pressure regulator, a valve casing having a high pressure inlet and a low pressure outlet, a dividing wall providing a bowl having two spaced and aligned valve apertures therein, valve seat members secured to said bowl in said apertures, a valve stem in said bowl, valve members carried by said stem and cooperating with said seat members to control the flow of fluid through said apertures, one of said valve members being held in predetermined position on one end of said stem to cooperate with one of said seat members on the interior of said bowl and the other of said valve members being threaded on the other end of said stem and extending to the exterior of said bowl to cooperate with the other of said seat members, a lock nut threaded on said stem on the exterior of said bowl for locking the valve member in position, an access hole in said casing to permit adjustment of said second valve member, pressure responsive means connected to said stem for controlling the action of said valve members, and a central guide means for said stem, said guide means being located wholly within, and supported by, said bowl between and on the high pressure side of said apertures, whereby said valve apertures are unobstructed and said valve stem and guide means are removed from the high velocity area of expanding fluid.

ALLEN D. MacLEAN.